United States Patent [19]

Ragsdale et al.

[11] 3,976,030

[45] Aug. 24, 1976

[54] PORTABLE PRESSURE SPRAY LIQUID SEED TREATER

[76] Inventors: Philip W. Ragsdale, 142 Ridge Road, Little Rock, Ark. 72207; Sidney M. Stephens, 5611 Big Oak Lane, Little Rock, Ark. 72209

[22] Filed: Oct. 6, 1975

[21] Appl. No.: 620,662

[52] U.S. Cl. .................. 118/303; 111/1; 111/73

[51] Int. Cl.² .................. B05C 5/02

[58] Field of Search .................. 118/19, 24, 303, 417; 111/1, 73

[56] References Cited

UNITED STATES PATENTS

| | | | |
|---|---|---|---|
| 871,354 | 11/1907 | Morgan | 111/73 |
| 1,698,436 | 1/1929 | Hendrickson | 118/417 |
| 2,968,266 | 1/1961 | Gustafson | 111/73 X |
| 3,707,136 | 12/1972 | Kostas | 118/303 |

*Primary Examiner*—Louis K. Rimrodt

*Attorney, Agent, or Firm*—David H. Semmes

[57] ABSTRACT

A portable pressure spray liquid chemical seed treatment consisting of three basic sections: a hopper feeding seed to be treated through a gate assembly which is adjustable to define a variable width curtain of seed into a lower chamber. Seed which is controlled by the gate assembly to fall by gravity in a curtain of variable width is sprayed from horizontally disposed nozzles and thereby coated with chemical spray. The seed so coated is then immediately available for planting.

5 Claims, 6 Drawing Figures

PORTABLE PRESSURE SPRAY LIQUID SEED TREATER

BACKGROUND OF INVENTION:

1. Field of the Invention:

The art of coating plant seeds is highly developed and is known to have many and sundry applications in the field of agriculture.

Certain plant seeds perform better in soils of varying pH levels, for example, alfalfa seed performs best in neutral to alkaline soils. Alfalfa seeds, for example, have a naturally occuring waxy layer on their surfaces against which some water soluble or water dispersible film-forming polymers will tend to form a snug envelope. However when seed is processed at the seed manufacturing point coatings which may be applied during seed processing are often broken in shipment to the field for implantation. As a result it has been a practice in the case of alfalfa to coat seeds with such treatments as lime in very small batches for use near to the agricultural regions.

By chemically treating seeds with various forms of chemicals to protect the seed and alter the immediate region around the seed against unfavorable pH soil conditions extensive working of the soil in the field is avoided. As illustrated in U.S. Pat. No. 3,808,740 the alternative to coating individual seeds with an alkaline substance is to apply 1–5 tons of an agent such as limestone per acre to the soil well in advance of planting. Manifestly applying the chemical agent directly to the soil is wasteful insofar as the seed soil interface is the only pertinent area to the germination of the seed.

According to the device of the instant invention a portable self contained apparatus is disclosed which allows for seed to be treated immediately in the field, particularly the device according to the instant invention may be mounted on the back of a field vehicle such as a pick-up truck to apply the chemical treatment to the seed in a particularly efficient manner without the danger of damage to the coating during handling between a distant seed treating facility and the point of use.

2. Description of the Prior Art

Various prior art devices have been proposed for applying various forms of perservative, both liquid and granular, to seed.

It should be remembered that plant seeds are fertilized ova already somewhat developed morphologically as embryonic plants, usually having more or less of a food supply and a protective seed coat (both angiosperms and gymnosperms). The seed coat provides protection for the food supply (e.g., endo sperm and cotyledons) and zygote, and this coat often functions to retard germination until environmental conditions are hospitable.

However, there has not existed in the prior art a device which is particularly suited for portable use that allows particularly efficient coating of a thin curtain of seed through a horizontal impingement of opposed treatment chemical sprays. The device according to the instant invention is usable with any number of a type of well-known chemical treatment agents, and the particularly utility of the device resides in its portability combined with its efficient manner of spraying a thin curtain of seed through a self-contained device which is more particularly taught hereinafter.

The following patents illustrate sundry types of apparatus and chemicals which are known in the prior art:

| | |
|---|---|
| Australia | 22,575 |
| Netherlands | 20,074 |
| Netherlands | 40,185 |
| PORTER | 3,808,740 |
| KNAPP | 3,775,034 |
| BRATSCHITSCH | 3,734,777 |
| KIRK | 3,703,404 |
| SCHREIBER | 3,698,133 |
| NAU | 3,666,523 |
| HEDEN | 3,605,688 |
| SCHREIBER | 3,545,129 |
| COOK | 3,477,842 |
| DICKINSON | 3,460,492 |
| WATANABE | 3,454,404 |
| GISIGER | 3,198,655 |
| WURSTER | 3,196,827 |
| RECKON | 3,173,794 |
| WILSON | 3,158,462 |
| CORDELL | 3,155,542 |
| GATZKE | 3,130,694 |
| HOPKINS | 2,973,740 |
| GUSTAFSON | 2,823,904 |
| GUYER | 2,644,676 |
| MAHONEY | 2,594,469 |
| BURGESSER | 2,579,733 |
| COOPER | 2,097,914 |
| LAMB | 2,071,846 |
| BRANDUS | 1,970,163 |
| CALKINS | 1,573,142 |

However in all of these prior art devices the teachings are for a specific chemical treatment with a type of tumbling coating operation which is less advantageous than the portable liquid pressure spray seed treater as is taught herein.

Specifically, patents to Porter, Kirk, Brink, Watanabe, Wilson, Brandus and the two patents to Schreiber disclose specific seed treatment chemical agents with no particularization to the apparatus as taught herein. For example, Kirk at column 4 tumbles a mixture of seed under a spray for a period of four hours together with a mixture of separate porous particles.

The two Netherlands patents and the Australian patent illustrate seed coating devices involving another tumbling operation and in the case of the later Netherlands patent a further mechanical treatment of seed through contact between rollers.

The patents to Knapp, Brink, and Schreiber, '129 illustrate prior art devices for pelletizing and encapsulating seed within a type of organic binder material. Schreiber further teaches an apparatus which requires an air suspension of seed through a series of manufacturing steps.

The patent to Bratschitsch illustrates a spray device where grain is conveyed and tumbled mechanically by an auger past a nozzle assembly. The patent to Cordell is a seed treating device which requires that the seed be mechanically agitated by an auger during the coating process. Similarly the seed treating devices in the patents to Calkins, Burgesser, and Guyer further illustrate mechanical agitating devices which are unsuitable for certain seeds, particularly soybeans. Such mechanical agitation would bruise delicate seed, such as soybean and unlike the thin curtain liquid seed treater as taught by the instant invention they would be unsuitable for treatment of delicate seed with very small quantities of chemicals.

The problem of bruising the seed is addressed in the patent to Garzke which employs a mechanical agitation of a seed and water slurry to minimize bruising. However, unlike the present invention a water slurry is necessary and is normally unavailable for on-site field planting operations. Various other apparatus for treating particulate matter are known where the particulate material is subject to a spring operation. The patent to Nau illustrates such a form of a hopper spray for creating granules of fertilizer previous to a conveying, mixing and tumbling operation for agglomerating the particular fertilizer granules. Fertilizer materials are not analogous to delicate seed, and Nau's device does not recognize the problems attendant to delicate seed treatment. The patent to Cook is another fertilizer treating device which employs spray nozzles and insofar as the problems of delicate seed treatment are not recognized is similarly not analogous. Similarly the patents to Hopkins, Mahoney, Cooper and Lamb are concerned with various apparatus and methods for spraying freely falling particulate matter other than seeds, and do not teach or resolve the problems of treating delicate seeds with small amounts of chemical treating agents. Furthermore there is no teaching in these non-analogous devices for controlling the width of a thin curtain of seed in conjunction with the pressure supplied to a subsequent chemical spray treatment assembly.

Process and apparatus for treating harvested grain in Reckon include a grinding operation and, of course, is not concerned with damage to a delicate seed, which problem being addressed and solved by the apparatus according to the instant invention.

Representative of seed treating prior art is Gustafson's use of a paddle or spreader assembly for agitation, and insofar as any mechanical agitating device would bruise delicate seed, such as soybeans, his teachings are not addressed to the problems of the instant application.

The patent to Dickinson teaches a process for violently agitating seeds in order to coat them with a magnetic material, and his continuous process employs a reverse air-flow to turbulently mix seed which is introduced within a slurry of chemicals. The patent to Wurster similarly is a violent agitation device unlike the thin curtain treatment device of the instant invention.

Finally other non-portable seed treating apparatus known are exemplified by the patents to Heden and Gisiger where a seed is supplied from a hopper for a type of contact with a chemical mix. Heden uses a spinning plate to centrifically accelerate seed outward and Gisiger employs an atomizing spray; however, the seeds themselves are first subject to a mechanical mixing agitation through paddles and a subsequent agitation through paddles. Such agitation and mechanical abrasion is inapplicable to delicate seed coats, such as has been discussed with respect to soybeans.

SUMMARY OF THE INVENTION:

According to the present invention an improved apparatus is taught which is self-contained and portable and allows a particularly efficient coating of a thin curtain of seed as an on-site operation immediately prior to planting. The present apparatus is taught for the purpose of treating seed with liquids such as fungicides, innoculants, herbicides, etc, immediately prior to planting. Because the model is lightweight, on the order of 60 lbs., and is designed to be an integral unit, it may be taken with the untreated seed into the field for on-site application immediately prior to introduction into a planter.

Unlike large commercial seed treating devices as illustrated by the above discussed exemplary prior art, a particular apparatus taught herein is automatic in operation and able to be quickly assembled and disassembled as necessary. All the individual components are independently supported on the vertical support frame, and the provision of novel adjustable gate assembly allows a quick and easy change in the rate of application of chemical to the seed without partial disassembly or changing of parts.

As has been discussed herein before, there has existed a need for a seed treating apparatus which may be used on-site in the field so as to preclude damage to the vulnerable seed coat during a shipment from a seed factory. The seed coat with its treatment chemical are both subject to abrasion and wear, and the apparatus according to the instant invention has its particular utility in being portable so that damage and destruction of the effectiveness of the seed coating operation through handling is effectively obviated.

Moreover, there is taught herein a coordinated gate assembly which defines a thin wide curtain of seed while at the same time adjusting the pressure of liquid chemical to the atomizing nozzles.

Moreover, other features, objects and advantages of the invention will become apparent by reference to the following detailed descriptions and drawings.

Figure 1:
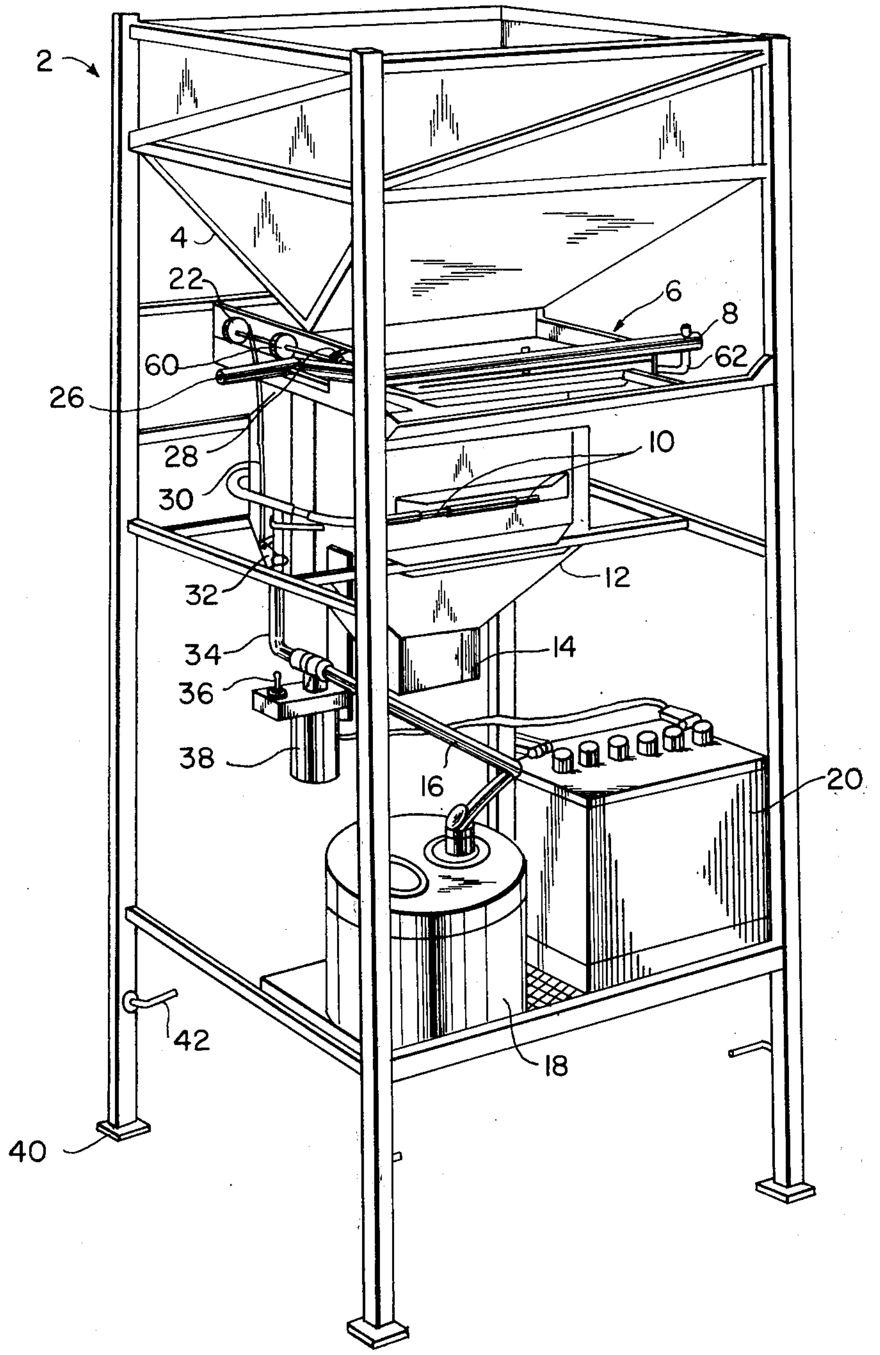
FIG. 1 schematically illustrates a plan view of the apparatus according to the instant invention.

DESCRIPTION OF THE PREFERRED EMBODIMENT:

Referring now more particularly to the drawings illustrating a preferred embodiment according to the invention, FIG. 1 shows in a plan view a prototype of the apparatus of the invention.

Figure 2:
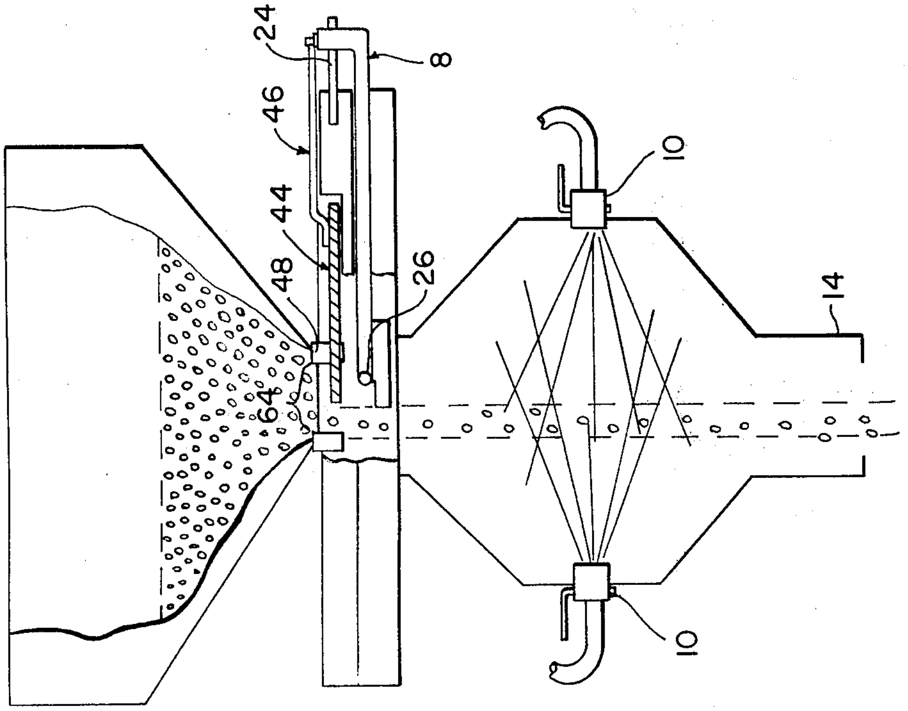
FIG. 2 schematically illustrates the operation of the horizontal gate assembly to define the thin curtain of seeds.

The portable pressure spray liquid chemical seed treater is entirely selfcontained and supported within a vertically extending support frame 2. The treater comprises, as a first basic component part, a hopper 4 which is proximate an open upper end of the frame, the hopper further including a horizontally disposed rectangular bottom opening which has a length that is elongated with respect to its width. As shown in FIG. 2 the bottom rectangular opening is positioned above an upwardly communicating adjustable gate assembly illustrated at 6. The gate assembly 6 is a self contained removable module that includes a horizontally slideable gate member 44 operable to define a variable open dimension to the width of the rectangular bottom opening of the hopper. Therefore as can be seen in FIG. 2 a thin wide curtain of seed may be defined, or closed off completely, by the horizontal movement of gate member 44 through a mechanism which will be hereinafter described. The seed curtain defined by the variable width of the rectangular opening then will pass by gravity into and within the spray chamber 12 which includes a plurality of opposed horizontally positioned spray nozzle assemblies 10.

The wide curtain of seed defined by the gate assembly is coated by the atomized chemicals from the nozzle assembly 10 and passes directly to the seed exit port which is another congruent rectangular exit port 14. Exit port 14 is operable to directly communicate the treated curtain of seed with a planting means immediately there below. (not illustrated) Because the seed which is contained in the hopper 4 is passed directly from an untreated state into the planter means below the spray chamber exit port 14 as the planting device there is no occasion for abrasion or damage to the seed coating applied. As has been before discussed, the unitary self-contained portable seed treater herein may be mounted on the back of a vehicle, such as a pick-up truck, for on-site field use directly with and roughly contemporaneous with the planting operation.

Support frame 2, as illustrated in FIG. 1, includes adjustable legs 40 which are adjustably positioned through a leg adjustment device schematically shown at 42. Because this device is self-contained and portable, weighing on the order of 60 lbs., its utility is primarily based upon being used on-site in connection with the entire planting operation.

The gate assembly 6 taught herein further includes a gate lever 8 which is horizontally pivotable about a gate support 56 through connection with the 56 and pivot 62. Lever 8 may be a formed piece of tubing including a handle 26 with a connecting lever between the lever and the horizontally movable gate as shown at 46 in FIG. 4.

Figure 4:
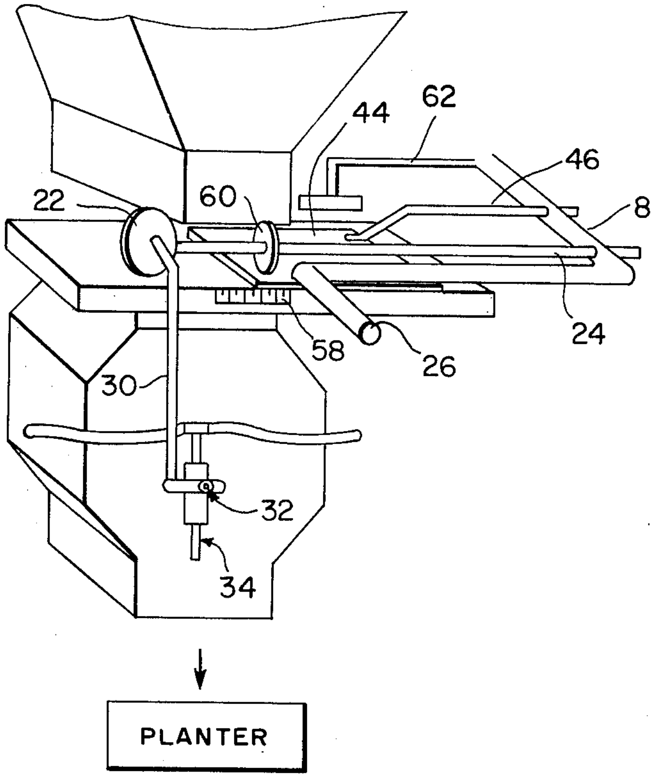
FIG. 4 schematically illustrates the interconnection of the gate lever with the operation of the chemical pressure valve.

In order to coordinate the pressure to the nozzle assemblies 10 in connection with the operation of the lever handle 26 a gate opening indicator 24, formed of a horizontally positioned rod secured to the lever extends through gate lever stop 28 and includes on its distal end an indicator disc 60, as shown in FIG. 4. The guage indicator disc 60, fixed on the gate lever opening indicator rod 24 will act as a horizontally movable indicator calibrated against guage 58 to indicate degree of opening and pressure to the spray nozzle assembly. The distal end of the gate lever opening indicator 24 further contacts a cam assembly, as shown in FIG. 4 at 22 to regulate the valve 32 by operating rod 30.

Therefore upon the movement of handle 26 the gate lever both controls the movement of the gate 44 and regulates the liquid chemical pressure from line 34 to the atomizing nozzles 10.

The chemical is self-contained within the support frame in a supply tank proximate to the bottom of the vertical support frame 2, shown as chemical tank 18. A suction line 16 is connected to an electric pump 38 and the pressure line 34 from the pump is communicated through valve 32 to the atomizing nozzles 10. The pump 38 may include a switch assembly 36 to close a circuit with an electric power supply 20 which is also mounted integrally within the support frame 2.

Figure 3:
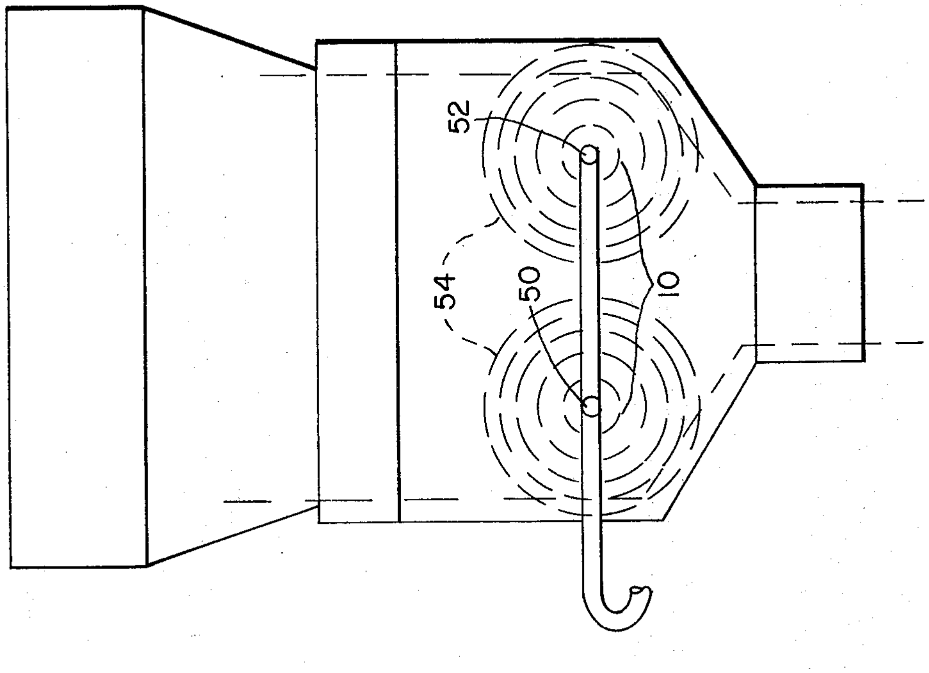
FIG. 3 similarly schematically illustrates the chemical spray pattern for the seed.
Figure 5:
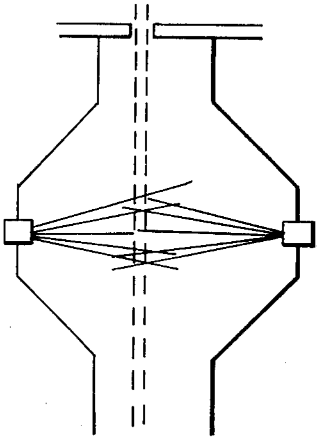
FIGS. 5 and 6 schematically illustrate coordination of the width of the seed curtain to the chemical spray pattern.
Figure 6:
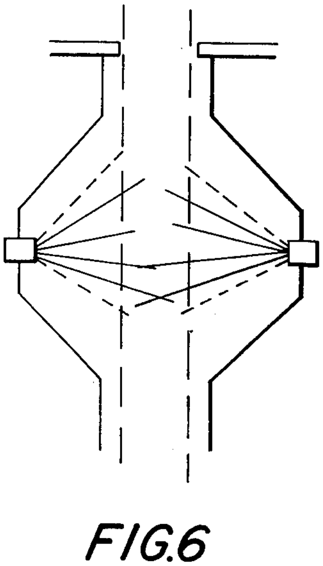

In operation the hopper 4 is loaded with seed to be treated, such as soybean, and the gate lever handle 26, from an intially left-most position in FIG. 2 may be opened to define a variable width curtain of seed which passes by gravity through spray chamber 12 directly into a planter, (schematically located in FIG. 4), via the spray chamber exit port 14. The horizontally disposed rectangular bottom opening 64 in the hopper 4 directly communicates with gate assembly 6 and gate 44 within guide 48 may either close off or define a variable open dimension to the width 64 of the opening from the hopper. Therefore, a wide narrow curtain of seed having variable width is allowed to fall by gravity with its vertical sides being parallel to a vertical plan which is parallel to the length of this rectangular opening in the hopper. In operation the opening of the gate 44 simultaneously opens valve 32 so that the spray pattern from the nozzles 50, 52 may be as illustrated at 54 in FIG. 3. For wider widths to the curtain of seed the spray nozzles may of a type where the cone angle of the spray changes as a function of the liquid pressure as shown in FIGS. 5 and 6. Such nozzles which allow a variable cone angle as a function of the pressure are well-known and readily available. Any nozzle which allows a variable spray pattern as a function to the pressure to the line would be particularly advantageous within the combination according to the instant invention, and if a series of treatments were required a plurality of vertically spaced nozzles may be employed to effect a mixture of liquid treatments upon the wide curtain of seed which is passing therebetween.

Due to the self-contained and portable nature of the apparatus herein the dangers of abrasion to the applied coating on the seed is effectively minimized. As a result of the coordinated gate and liquid chemical pressure control a completely uniform coating of chemical for every seed may be adjusted to apply fluid chemical at any rate, for example, from one to about ten ounces per bushel of seed. It should remembered that this lightweight self-contained model is designed to be taken with the seed into the field along with the planter so that the objections in the prior art from handling damage to a seed coating are effectively obviated. With this treater many kinds of seed can be treated such as rice, soybeans, oats, vetch, wheat, cotton and corn. Do to the modular construction of a hopper 4, a gate assembly 6, and spray chamber 12 being self-contained within the vertical support frame 2 manufacture and assembly of the device is particularly facilitated. Unlike prior art devices, as herein and before discussed, this lightweight portable liquid pressure spray chemical seed treater is usable in the field for immediate application of the treatment chemicals prior to planting. By being so portable the device serves a long standing need to treat seeds on-site thus, obviating damage to the coatings on such delicate seeds such as soybeans during a handling process between a seed manufacturing operation and the ultimate point of use.

While one embodiment of the invention has been herein shown and described minor changes in details can be effected without departing from the spirit and scope of the invention which is to be defined by and solely limited by the appended claims.

We claim:

1. A portable pressure spray liquid chemical seed treater comprising a vertically extending support frame, defining an open upper end and a bottom external mounting means, and further comprising:

A. An upwardly open hopper positioned proximate said open upper end of said frame, said hopper further including a horizontally disposed rectangular bottom opening having a length elongate with respect to its width; and B. An adjustable gate assembly below and upwardly communicating with said rectangular opening, said gate assembly further comprising a horizontally slideable gate member operable to define a variable open dimension to said width of said rectangular bottom opening wherein said gate assembly further includes a gate operating lever, and said lever further includes a gate width opening guage means; and C. A liquid chemical seed treating chamber having an upper entrance port below and upwardly communicating with said variable width rectangular gate opening, said chamber further including liquid chemical spray nozzle means horizontally positioned below said entrance port and operable to impinge a liquid chemical spray horizontally against either side of a vertical plane parallel to said length dimension of said variable width rectangular gate opening wherein said spray nozzle means further includes a valve means, operably connected with said gate width opening guage means, wherein said lever controls both the width of said gate opening and the liquid pressure to said nozzles, whereby seed placed in said hopper will fall by gravity in a variable width curtain past a regulated liquid chemical spray from said horizontally disposed nozzles and be thereby coated with said chemical spray; and D. A rectangular exit port operable for directly communicating said coated seed curtain with a planting means for said seed.

2. The portable seed treater of claim 1 wherein said guage means further comprises a horizontal rod attached to said lever and connected to a cam which in turn is connected to said valve by an operating rod.

3. The portable seed treater of claim 1 wherein said spray nozzles means further comprises two horizontally disposed nozzles on either side of said vertical plane and an electric pump to pressurize said liquid seed treatment chemical.

4. The portable seed treater of claim 3 further including a liquid chemical supply tank and an electric power supply integrally mounted within and proximate the bottom of said vertical support frame.

5. The portable seed treater of claim 1 wherein said liquid spray nozzle means includes horizontally disposed nozzles operable to define a liquid chemical spray in a cone pattern as a function of said liquid pressure.

* * * * *